(12) United States Patent
Fuente et al.

(10) Patent No.: US 9,256,367 B2
(45) Date of Patent: *Feb. 9, 2016

(54) DATA STORAGE AND MOVING OF RELATIVELY INFREQUENTLY ACCESSED DATA AMONG STORAGE OF DIFFERENT TYPES

(75) Inventors: Carlos Francisco Fuente, Portsmouth (GB); William James Scales, Portchester (GB); Barry Douglas Whyte, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 68 days.

This patent is subject to a terminal disclaimer.

(21) Appl. No.: 13/497,788

(22) PCT Filed: Aug. 26, 2010

(86) PCT No.: PCT/EP2010/062463
§ 371 (c)(1),
(2), (4) Date: Mar. 22, 2012

(87) PCT Pub. No.: WO2011/036020
PCT Pub. Date: Mar. 31, 2011

(65) Prior Publication Data
US 2012/0198153 A1 Aug. 2, 2012

(30) Foreign Application Priority Data
Sep. 25, 2009 (EP) ..................... 09171306

(51) Int. Cl.
*G06F 12/16* (2006.01)
*G06F 3/06* (2006.01)

(52) U.S. Cl.
CPC ............ *G06F 3/0607* (2013.01); *G06F 3/0647* (2013.01); *G06F 3/0685* (2013.01)

(58) Field of Classification Search
USPC .................................................. 711/114, 103
See application file for complete search history.

(56) References Cited

U.S. PATENT DOCUMENTS

| 5,318,857 A | 6/1994 | Haluska |
| 6,542,967 B1 | 4/2003 | Major |

(Continued)

FOREIGN PATENT DOCUMENTS

| CN | 1794199 | 6/2006 |
| EP | 1645960 | 5/2007 |

(Continued)

OTHER PUBLICATIONS

U.S. Appl. No. 13/039,245, filed Mar. 2, 2011 by inventors J.P. Agombar, et al., 22 pages.

(Continued)

*Primary Examiner* — Jared Rutz
*Assistant Examiner* — Christopher Do
(74) *Attorney, Agent, or Firm* — Rabindranath Dutta; Konrad, Raynes, Davda and Victor LLP (57) ABSTRACT

A data storage system comprises a controller, a first lower performance storage medium and a second higher performance storage medium. The controller is connected to the storage mediums and is arranged to control Input/Output (IO) access to the storage mediums. In operation, the controller is arranged to store an image on the first storage medium, initiate a copy function from the first storage medium to the second storage medium, direct all IO access for the image to the second storage medium, and periodically age data from the second storage medium to the first storage medium.

10 Claims, 8 Drawing Sheets

(56) References Cited

U.S. PATENT DOCUMENTS

| | | | |
|---|---|---|---|
| 7,107,395 | B1 | 9/2006 | Ofek et al. |
| 7,165,059 | B1 | 1/2007 | Shah et al. |
| 7,188,272 | B2 | 3/2007 | Bartfai et al. |
| 7,225,211 | B1 | 5/2007 | Colgrove et al. |
| 7,343,356 | B2 | 3/2008 | Prahlad et al. |
| 7,360,048 | B2 | 4/2008 | Agombar et al. |
| 7,386,674 | B1 | 6/2008 | Lango |
| 7,386,695 | B2 | 6/2008 | Fuente |
| 7,454,569 | B2 | 11/2008 | Kavuri et al. |
| 7,509,523 | B2 | 3/2009 | Agombar et al. |
| 7,571,290 | B1 * | 8/2009 | Ranade et al. ............ 711/161 |
| 7,606,934 | B1 * | 10/2009 | Vengerov et al. ......... 709/238 |
| 7,676,641 | B2 | 3/2010 | Agombar et al. |
| 7,793,144 | B2 | 9/2010 | Agombar et al. |
| 8,533,397 | B2 * | 9/2013 | Bar-El et al. ............. 711/135 |
| 2004/0039891 | A1 | 2/2004 | Leung et al. |
| 2004/0044854 | A1 * | 3/2004 | Gibble et al. ............. 711/154 |
| 2005/0071560 | A1 | 3/2005 | Bolik |
| 2005/0278391 | A1 | 12/2005 | Spear et al. |
| 2006/0112244 | A1 | 5/2006 | Buah et al. |
| 2006/0139697 | A1 | 6/2006 | Fuente |
| 2006/0161700 | A1 | 7/2006 | Boyd et al. |
| 2006/0179061 | A1 | 8/2006 | D'Souza et al. |
| 2007/0061531 | A1 | 3/2007 | Bartfai et al. |
| 2007/0204119 | A1 | 8/2007 | Murotani et al. |
| 2007/0294493 | A1 | 12/2007 | Buah et al. |
| 2008/0022051 | A1 * | 1/2008 | Osanai et al. ............. 711/138 |
| 2008/0114951 | A1 | 5/2008 | Lee |
| 2008/0215837 | A1 | 9/2008 | Agombar et al. |
| 2009/0024813 | A1 | 1/2009 | Uysal et al. |
| 2009/0037662 | A1 | 2/2009 | La Frese et al. |
| 2009/0043978 | A1 | 2/2009 | Sawdon et al. |
| 2010/0023561 | A1 | 1/2010 | Zlotnick |
| 2010/0077160 | A1 | 3/2010 | Liu et al. |
| 2010/0088468 | A1 | 4/2010 | Agombar et al. |
| 2010/0174864 | A1 | 7/2010 | Bar-El et al. |
| 2011/0208932 | A1 | 8/2011 | Agombar et al. |

FOREIGN PATENT DOCUMENTS

| | | |
|---|---|---|
| WO | 2011036015 | 3/2011 |
| WO | 2011036020 | 3/2011 |

OTHER PUBLICATIONS

U.S. Appl. No. 13/039,108, filed Mar. 2, 2011 by inventors J.P. Agombar, et al., 22 pages.
U.S. Appl. No. 13/069,293, filed Mar. 22, 2011 by inventors J.P. Agombar, et al., 24 pages.
U.S. Appl. No. 13/244,094, filed Sep. 23, 2011 by inventors C.B. Beeken, et al., 50 pages.
U.S. Appl. No. 13/251,867, filed Oct. 3, 2011 by inventors C.B. Beeken, et al., 32 pages.
A. Osuna et al., "N Series Snapshot: A Technical Discussion", Redbooks Paper, 2007, pp. 1-24.
International Search Report for International Application No. PCT/EP/2010/062385 filed on Aug. 25, 2010, dated Oct. 1, 2010, pp. 1-12.
International Search Report for International Application No. PCT/EP2010/062462 filed on Aug. 26, 2010, dated Jan. 26, 2011, pp. 1-15.
Substitute Specification for, U.S. Appl. No. 13/497,79, filed Mar. 22, 2012,by inventors Carlos F. Fuente et al., pp. 1-11.
Preliminary Amendment for, U.S. Appl. No. 13/497,79, filed Mar. 22, 2012,by inventors Carlos F. Fuente et al., pp. 1-8.
R. Hou, et a., "Data Replication and Recovery with Dell/EMC SnapView 2.0 and MirrorView", Dell Enterprise Systems, Feb. 2003, pp. 23 total.
W. Xiao, et al., "Case for Continuous Data Protection at Block Level in Disk Array Storages", IEEE Transactions on Parallel and Distributed Systems, vol. 20, No. 6, Jun. 2009, pp. 14 total.
PCT International Search Report dated Sep. 14, 2011 for Application No. PCT/EP2011/057950 filed May 17, 2011. pp. 12 total.
"Information Materials for IDS" dated Oct. 5, 2011 from Japanese Office Action dated Sep. 20, 2011 for Application No. 2011-533674 filed Oct. 20, 2009, pp. 2 total.
Preliminary Remarks dated May 4, 2012 pp. 1-2 for U.S. Appl. No. 13/464,633, filed May 4, 2012 by inventors Carlos F. Fuente et al.
U.S. Appl. No. 13/464,633, filed May 4, 2012 entitled, "Data Storage", invented by Carlos F. Fuente et al pp. 1-34.
U.S. Appl. No. 13/829,488, filed Mar. 14, 2013, entitled, "Data Storage Using Bitmaps", invented by Carols F. Fuente et al., pp. 1-20.
R. Hou "Data Replication and Recovery with Dell/EMC SnapView 2.0 and MirrorView", Dell Enterprise Systems, Feb. 2003, pp. 1-23.
Osuna et al. "N Series Snapshot: A Technical Discussion", Redbooks Paper, 2007, pp. 1-24.
International Search Report for International App. No. PCT/EP2010/062385, filed on Aug. 25, 2010 dated Oct. 1, 2010, pp. 1-12.
International Search Report for International App. No. PCT/EP2010/062462, filed on Aug. 26, 2010, dated Jan. 26, 2011, pp. 1-15.
Office Action, dated Nov. 7, 2013, for U.S. Appl. No. 13/464,633, filed May 4, 2012, entitled "Data Storage", invented by Carlos F. Fuente et al., pp. 1-32.
Response to Office Action, dated Feb. 7, 2014, for U.S. Appl. No. 13/464,633, filed May 4, 2012, entitled "Data Storage", invented by Carlos F. Fuente et al., pp. 1-11.
Office Action, dated Nov. 19, 2013, for U.S. Appl. No. 13/497,791, filed Mar. 22, 2012, entitled "Data Storage Using Bitmaps", invented by Carlos F. Fuente et al., pp. 1-37.
Office Action, dated Nov. 18, 2013, for U.S. Appl. No. 13/829,488, filed Mar. 14, 2013, entitled, "Data Storage Using Bitmaps", invented by Carlos F. Fuente et al., pp. 1-32.
Final Office Action, dated May 22, 2014, for U.S. Appl. No. 13/464,633, filed May 4, 2012, entitled ,"Data Storage", invented by Carlos F. Fuente et al., Total 20 pages.
Response to Office Action, dated Feb. 18, 2014, for U.S. Appl. No. 13/497,791, filed Mar. 22, 2012, entitled "Data Storage Using Bitmaps", invented by Carlos F. Fuente et al., Total 12 pages.
Notice of Allowance, dated Jun. 10, 2014, for U.S. Appl. No. 13/497,791, filed Mar. 22, 2012, entitled "Data Storage Using Bitmaps", invented by Carlos F. Fuente et al., Total 18 pages.
Response to Office Action, dated Feb. 18, 2014, for U.S. Appl. No. 13/829,488, filed Mar. 14, 2013, entitled, "Data Storage Using Bitmaps", invented by Carlos F. Fuente et al., Total 9 pages.
Notice of Allowance, dated May 16, 2014, for U.S. Appl. No. 13/829,488, filed Mar. 14, 2013, entitled, "Data Storage Using Bitmaps", invented by Carlos F. Fuente et al., Total 16 pages.
Chinese Office Action, dated Feb. 8, 2014, for Application No. 201080042501.6, pp. 1-8.
Office Action, dated Dec. 24, 2014, for U.S. Appl. No. 13/464,633, filed May 4, 2012, invented by Carlos F. Fuente et al., Total 10 pages.
Response to Office Action, dated Mar. 24, 2015, for U.S. Appl. No. 13/464,633, filed May 4, 2012, invented by Carlos F. Fuente et al., Total 12 pages.
Final Office Action, dated Jun. 10, 2015, for U.S. Appl. No. 13/464,633, filed May 4, 2012, invented by Carlos F. Fuente et al., Total 19 pages.
Response to Final Office Action, dated Sep. 10, 2015, for U.S. Appl. No. 13/464,633, filed May 4, 2012, invented by Carlos F. Fuente et al., Total 10 pages.
Notice of Allowance, dated Oct. 1, 2015, for U.S. Appl. No. 13/464,633, filed May 4, 2012, invented by Carlos F. Fuente et al., Total 9 pages.

* cited by examiner

DATA STORAGE AND MOVING OF RELATIVELY INFREQUENTLY ACCESSED DATA AMONG STORAGE OF DIFFERENT TYPES

CROSS-REFERENCE TO RELATED APPLICATION

This application is national phase filing under 35 U.S.C. §371 of International Application No. PCT/EP2010/062463 filed on Aug. 26, 2010, claiming priority from Ser. No. 09/171,306.5 EP, filed Sep. 25, 2009, wherein International Application PCT/EP2010/062463, and 09171306.5 EP are all incorporated herein by reference in their entireties.

BACKGROUND

This disclosure relates to a data storage system and to a method of operating the data storage system. In one embodiment, a FlashCopy® (FlashCopy is a registered trademark or trademark of International Business Machines Corporation in the United States and/or other countries.) process is used to separate frequently accessed data from less frequently accessed data.

Within a large data storage system there are likely to be multiple different types of storage media in use. The various types can be classified by a number of metrics, such as capacity, availability, performance and cost. Examples of different properties that distinguish the different classes of storage might include attachment technology (for example, SATA or FC/SCSI) drives, redundancy scheme (for example, RAID-5, RAID-1 or RAID-10), and space-saving algorithm (for example, compression, de-duplication or non-compressed). A new class of storage technology that is emerging is storage-class memory, of which Flash Memory is a preferred example. The different applications and servers that are being hosted by the storage media will have varying requirements with respect to these metrics. Each application will tend to have its own requirements, and a given application's requirements will also tend to vary over time as the demands on that application vary.

SUMMARY OF THE DESCRIBED EMBODIMENTS

Certain embodiments provide a controller, a first lower performance storage medium, and a second higher performance storage medium. The controller is coupled to the first storage medium and the second storage medium, and configured to control Input/Output (IO) access to the first storage medium and the second storage medium. In certain embodiments, the controller stores an image on the first storage medium, and initiates a copy function from the first storage medium to the second storage medium. The controller directs all IO access for the image to the second storage medium, and periodically age data from the second storage medium to the first storage medium.

DETAILED DESCRIPTION

It is a therefore a very complex task to optimise the allocation of storage amongst applications, to ensure the best use of the available resources, in order to meet the requirements of a business as a whole. The work required to perform a change to try and optimise the resource allocation can also be expensive. Re-allocating storage to a server can require server downtime, plus significant administrator effort in order to perform the change. The use of a product that implements storage virtualization, such as SAN Volume Controller (SVC), can eliminate the server downtime, and significantly reduce the administrative effort. Such products provide a data migration feature that allows data to be relocated from one class of storage to another, transparently to the using system. One limit of these changes, however, is that the most convenient unit of management is at the vdisk, volume or logical unit (LUN) level. A whole vdisk must be given the same class of storage. There are many examples though, where the vdisks in a data storage system may not comprise data with homogeneous requirements. In fact, it is likely that a completely homogenous vdisk is the exception rather than the norm. One particular case where there will be different regions of data with different requirements is for performance.

Conventional caching techniques can help with this problem to a limited degree. A write cache can allow a host to perceive a low write service time, even where backed by slow access storage. A write cache can also absorb a short burst of write activity quickly, and feed it to slower backend storage over a longer period of time, emulating higher performance storage. Both these capabilities are known, and implemented in, for example, SVC. But write caching as currently used is limited in its capabilities. Firstly, write IO must ultimately be sent to the backing storage from the write cache. It is possible to eliminate a small proportion of the traffic, but the majority must still be processed there. If the backing storage is unable to sustain the host application write traffic, then the write cache becomes full and the advantage is lost. Additionally, the size of a write cache is small compared to the total amount of system storage, possibly less than 1%. Together, these mean that a conventional write cache is not sufficient to allow storage within a low-performance class to be used for those portions of a disk that have higher performance requirements.

Some classes of storage, such as those that implement compression, or data de-duplication, present an extreme example of a low performance store. Though these might provide significant cost savings in terms of capacity required to satisfy a given server or application's storage requirements, the performance penalty for performing write IO against these stores means they cannot be used for general purpose IO. Their algorithms increase the cost of performing IO, and also place a limit on the peak throughput that they can sustain.

Certain embodiments provide a data storage system comprising a controller, a first lower performance storage medium and a second higher performance storage medium, the controller connected to the storage mediums and arranged to control IO access to the storage mediums, wherein the controller is arranged to store an image on the first storage medium, initiate a copy function from the first storage medium to the second storage medium, direct all IO access for the image to the second storage medium, and periodically age data from the second storage medium to the first storage medium.

Additional embodiments provide a method of operating a data storage system, the system comprising a controller, a first lower performance storage medium and a second higher performance storage medium, the controller connected to the storage mediums and arranged to control IO access to the storage mediums, wherein the method comprises the steps of storing an image on the first storage medium, initiating a copy function from the first storage medium to the second storage medium, directing all IO access for the image to the second storage medium, and periodically aging data from the second storage medium to the first storage medium.

Additional embodiments provide a computer program product on a computer readable medium for operating a data storage system, the system comprising a controller, a first lower performance storage medium and a second higher performance storage medium, the controller connected to the storage mediums and arranged to control IO access to the storage mediums, the product comprising instructions for storing an image on the first storage medium, initiating a copy function from the first storage medium to the second storage medium, directing all IO access for the image to the second storage medium, and periodically aging data from the second storage medium to the first storage medium.

In certain embodiments, it is possible to provide a data storage system in which the system will automatically identify and segregate high-performance regions from low-performance regions with a low processing overhead. Therefore, the portions of the original storage medium containing data which is important for system performance receive better service than the rest, and therefore the system as a whole is advantaged. Frequently accessed, high-performance-requiring data on a vdisk is separated from less-performance-requiring data and is assigned to the very highest-performing class of storage, leaving the rest of the vdisk data on a lower-performing class of storage. This capability maximises the performance of the applications and servers on the storage medium, for the lowest cost.

Storage virtualization platforms such as SVC can permit data migration policies to be expressed to allow data fragments as small as 16 MB to be placed on an appropriate class of storage. This capability can be sufficient to optimise performance, but pre-supposes a means to identify which pieces of a large vdisk require higher over lower performance. One technique that could be employed to achieve this goal is to collect access statistics at a fine enough granularity such that they could be analysed, and used to migrate data as required. But these techniques will likely not operate well enough to achieve the required benefit. If the granularity of tracking is too coarse, then it will fail to distinguish the classes of data adequately, and the disk's performance characteristics will appear homogeneous. If the granularity is made fine enough to distinguish effectively, then the total amount of statistics data that needs to be collected, communicated, and processed, will burden the system with an unsustainable amount of extra processing work. Certain embodiments provide a means of having the storage system automatically identify and segregate high-performance regions from low-performance regions with much lower processing overhead than the statistics based approach.

In certain embodiments, the system further comprises a third higher performance storage medium, wherein the controller is further arranged to initiate a copy function from the second storage medium to the third storage medium, direct all IO access for the image to the third storage medium and to periodically age data from the third storage medium to the first storage medium. Certain embodiments of the storage system implement a single lower performance storage medium and two higher performance storage media. In certain embodiments the controller is further arranged, following the periodic ageing of data to the first storage medium, to switch the target of all IO access for the image between the second and third storage media and to switch the direction of the copy function between the second and third storage media. Once the data stored by the first higher performance storage medium has reached a certain size (or after a certain amount of time has elapsed) then the IO access is switched to the second higher performance storage medium. This results in a new generation of data being built up on the second higher performance storage medium, while the data stored on the first higher performance storage medium can be aged back onto the slower storage medium.

In certain embodiments, the controller is further arranged, when periodically aging data from the second or third storage medium to the first storage medium, to age only data that is not present on both the second and third storage media. In certain embodiments of the storage system using two higher performance storage media, the backup merging process can be made more efficient by only merging back to the slower performing storage medium data that is only found on the specific higher performing storage medium that is having its data merged back.

In one embodiment, the second and third storage media comprise a single disk and wherein the controller is further arranged to maintain address metadata for data stored by the single disk and to adjust the address metadata in response to IO that would otherwise copy data between the second and third storage media. Virtualisation of the faster storage within a single disk will reduce the actual number of physical copy operations that are required to take place to actually implement certain embodiments. This will reduce the amount of power and time load on the storage system components.

Ideally, the system further comprises a highest performance tier of storage medium, wherein the second and third storage media comprise an intermediate tier between the highest performance tier and the first storage medium and wherein the controller is further arranged to initiate a copy function from the intermediate tier to the highest performance tier, direct all IO access for the image to the highest performance tier and to periodically age data from the highest performance tier to the first storage medium. The inventive storage system can be extended to included a further tier of yet better performing storage which can always be used as the storage to which the IO access is directed. The higher performing storage media can then configured into a middle tier which is used as the store for the previous generation of data. This use of a highest performance tier further improves the performance versus cost of the overall storage system.

Ideally, the copy function from the first storage medium to a different storage medium comprises both a copy-on-write function and a copy-on-read function. Using a copy function such as FlashCopy® can be extended into using copy-on-read as a trigger for copying data off the slower first storage medium onto a faster storage medium. This will further enhance the system performance in that commonly accessed data is more likely to be found on the faster storage media.

Embodiments will now be described, by way of example only, with reference to the accompanying drawings.

Figure 1A:
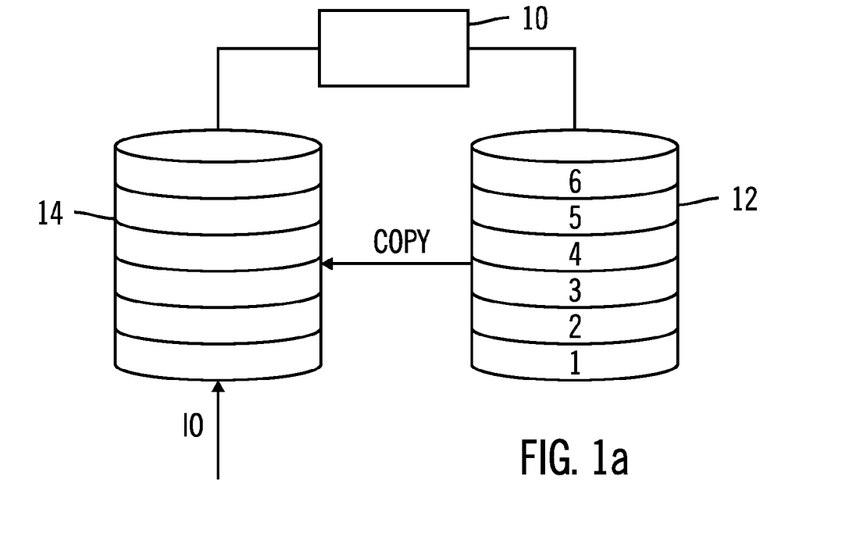
FIGS. 1a and 1b are schematic diagrams of a storage system.

A data storage system is shown in FIG. 1, which comprises a controller 10, a first, lower performance storage medium 12 and a second, higher performance storage medium 14. The controller 10 is connected to the storage mediums 12 and 14 and is arranged to control the IO access to the storage mediums 12 and 14. Although the two storage media 12 and 14 are shown as the same size, their physical size and/or data storage capacity may be different. The lower performance storage medium 12 could be a hard disk and the higher performance storage medium 14 could be a solid state memory device, for example. IO access to the data storage, whether read or write access, is managed by the controller 10.

The controller 10 is arranged to store an image on the first storage medium 12. This image will be data representing multiple applications and servers. The controller 10 is further arranged to initiate a copy function from the first storage medium 12 to the second storage medium 14. The copy function will copy data to the second storage medium 14 when there is a read or write access to any data within the image stored by the first storage medium 12. The controller is arranged to direct all IO access for the image to the second storage medium 14, and additionally will periodically age data from the second storage medium 14 to the first storage medium 12. This process of aging the data will be described in more detail below.

Figure 1B:
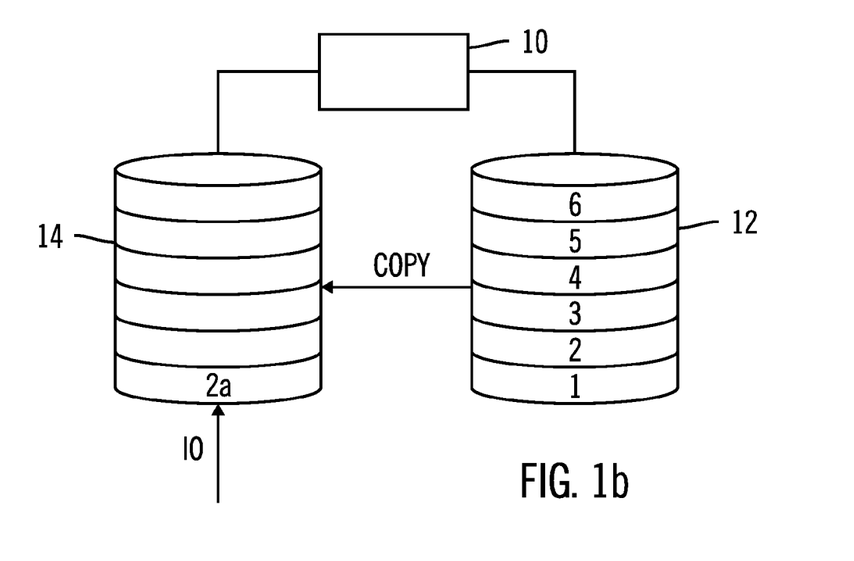

FIG. 1b shows the situation after there has been IO access to the sector labelled 2 of the first storage medium 12. This IO access could be to overwrite some of the data in this sector. The controller resolves this by using the incoming IO and the original sector 2 to create the new sector 2a on the faster storage medium 14. Since all IO access is directed to the faster storage medium 14, any future read or write accesses to the data in sector 2 will be handled directly by the faster storage medium 14, without the need to make any access to the original image stored by the slower storage medium 12.

Figure 2:
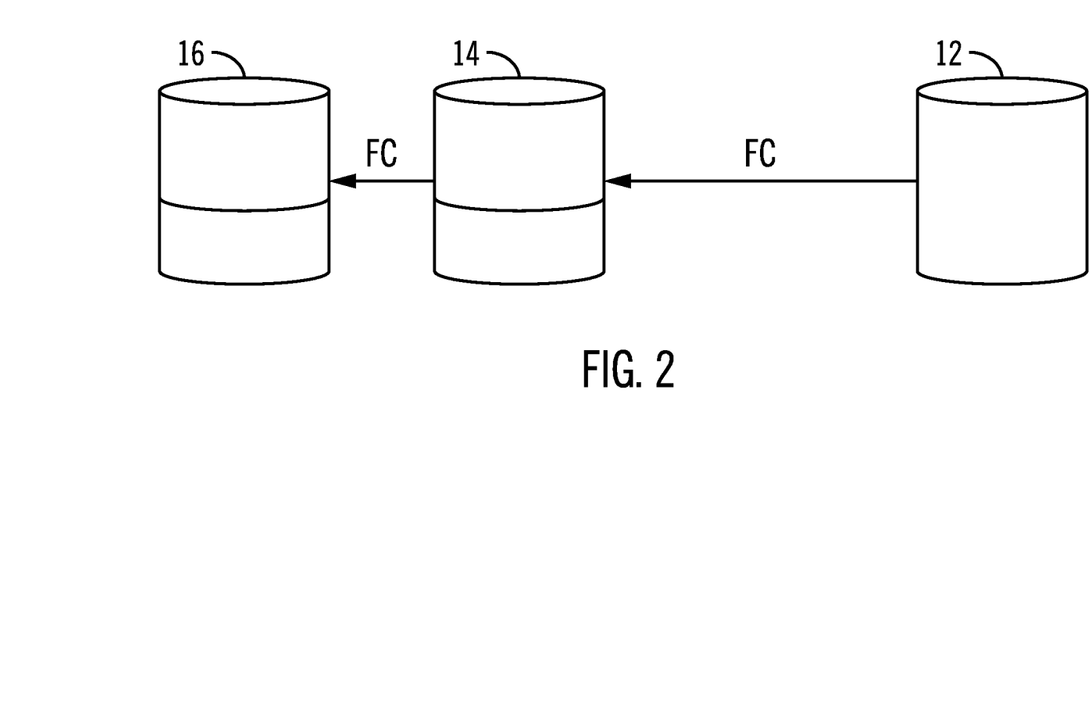
FIG. 2 is a schematic diagram of a further embodiment of the storage system.

A second embodiment of the system is shown in FIG. 2. In this embodiment, the system further comprises a third higher performance storage medium 16, which may be of the same type as the second higher performance storage medium 14. The controller 10 is further arranged to initiate a copy function from the second storage medium 14 to the third storage medium 16. This embodiment of the storage system uses the FlashCopy® and Space-Efficient (thin provisioning) features of SAN Volume Controller, which are further extended to achieve the desired data separation. The letters FC in the Figure refer to the FlashCopy® function with the arrow indicating the source and target of the copy function. At the most fundamental level, an arrangement of two Space-Efficient FlashCopy® images (vdisks) is held on the high-performance, high-cost storage media 14 and 16, with the remainder of the storage held as a (typically) fully-allocated image (vdisk) on lower-cost storage medium 12.

In this version of the storage system, all application IO is directed at the left-most FlashCopy® image stored on the third storage medium 16. This image contains the most recently accessed data. The image grows as the recent working set for the application grows. The middle image stored by the second storage medium 14 contains an earlier generation of this recent access disk. The size of the data stored on this medium 14 does not change, and serves read IO to satisfy accesses required that are not captured by the left-most image on the medium 16. The right image of the first storage medium 12 contains the full image of the application disk, however this medium 12 does not contain the most recent updates, which are held on the two left most disks 14 and 16.

Write accesses are handled using a conventional FlashCopy® algorithm, using a copy-on-write technique. Therefore, if the data to be over-written is already located on the left-most disk 16, then it is over-written in place. If data has not been recently accessed, it might be found on the middle disk 14, or the right-most disk 12. Wherever the data is found, it is read from its current location, merged with the new write data, and written to the left-most disk 16. In this mode of operation therefore, the left-most disk 16 is accumulating changes that amount to the recent working set of the application. Many future IO accesses will be serviced directly by the left-most disk 16. Some IO accesses will not have been accumulated there and will instead be serviced by the middle disk 14, or exceptionally by the right-most-disk 12.

If the arrangement described above were static, then the left-most disk 16 would, over time, grow to be closer to the full-size of the right-most disk 12, as even infrequently accessed data, once accessed, would begin to consume space on the storage medium 16. Eventually all of the data on the lower performance disk 12 would be accessed, and the data stored by the higher performance disk 16 would be the entirety of the original data image with IO amendments. Therefore an ageing process is needed to remove infrequently accessed data from the left-most disk 16. Such an aging process is also needed in a two storage medium system as shown in FIG. 1.

Figure 3A:
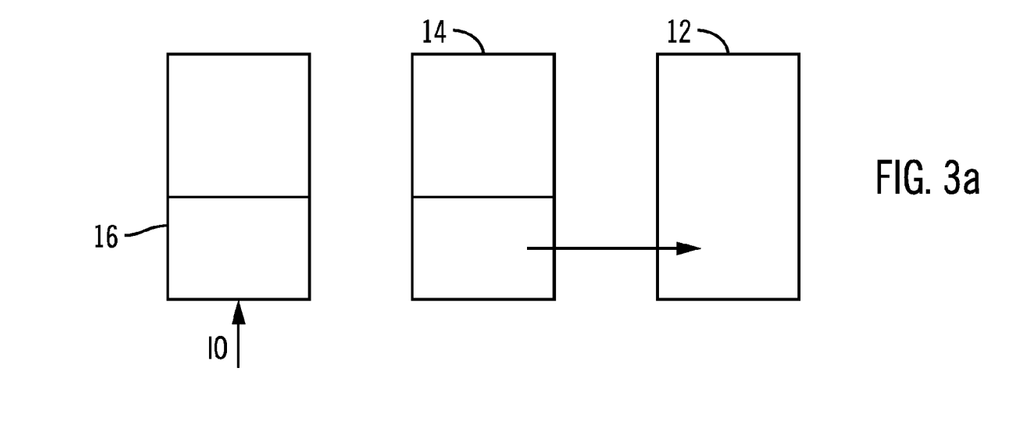
FIGS. 3a and 3b are schematic diagrams showing aging of data within the storage system.
Figure 3B:
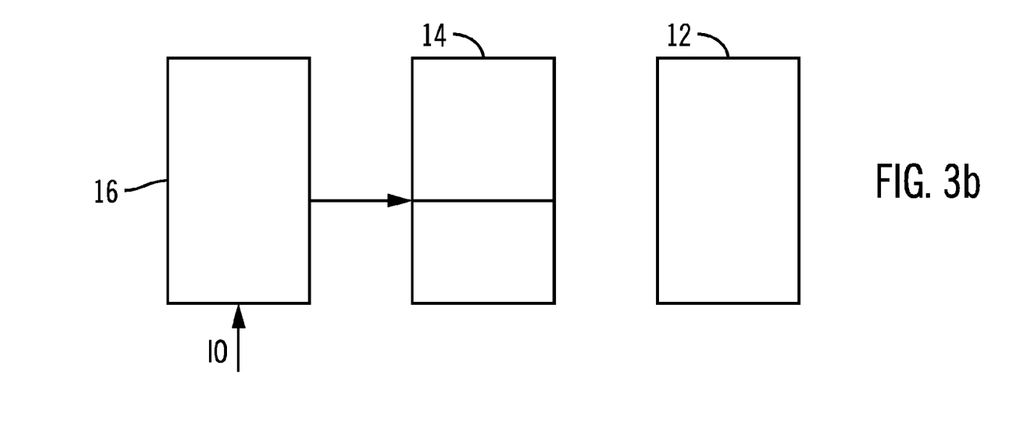

This process is illustrated in FIG. 3, and essentially operates by merging the contents of the middle disk 14 into the right-most disk 12, as shown in FIG. 3a, relocating the left-most disk 16 to become the next generation middle-disk 14, identifying an empty space-efficient vdisk, and using FlashCopy® establishing it as the "left-most" disk with initial logical contents being identical to that of the previous generation left-most disk (now middle disk) and redirecting host IO to be addressed to the new "left-most" disk, as shown in FIG. 3b. Such a rearrangement can be made non-disruptive by queuing and dequeuing host IO in a conventional way while the rearrangement is performed. In the embodiment of FIG. 3, the roles of the two disks 14 and 16 have been reversed. In a two storage medium system as shown in FIG. 1, the effect of the aging process would be to merge some of the data (the older data) stored by the storage medium 14 back onto the first storage medium 12 leaving free space on the medium 14.

By this technique, the left-most disks and middle disks tend to contain the most recently written data, and therefore capture that data which requires the highest performance, separating it from the remainder of the less accessed data, which remains on the original disk 12. This allows this storage to be held on a smaller amount of the highest class (and highest cost) storage to maximum effect.

This system arrangement is advantageous when compared to statistics analysis in that it identifies the frequently written data with very little metadata manipulation being required, using algorithms that can scale to cover a large proportion of a data centre's data storage. The system can also operate at a very fine grain, using, for example, SVC's Space Efficient FlashCopy® feature which already operates at a 64 k grain. It is therefore an improvement over both conventional caching algorithms in terms of the amount of high performance storage that can be accessed, and statistics based scheme, in terms of the efficiency of operation at a very fine grain.

A further feature of this system arrangement is that the right-most disk 12, on the slowest storage, receives no host write activity, and the only write activity it receives is from the merge activity from the middle disk 14 during the ageing process. This makes it possible to contemplate using comparatively low performance classes of memory, such as de-duplicated or compressed stores, to store data. This is because the write stream is a coalesced summary of the previous accumulation period's write IO, so has already been "compressed" to a degree by removing over-writes, therefore only the most recent generation of data need be sent through the expensive write process and the merge process is entirely decoupled from the host write process, and so is able to smooth bursts of host write IO over a long period of time, and so the peak write workload that needs to be satisfied is much lower than the host.

Figure 4A:
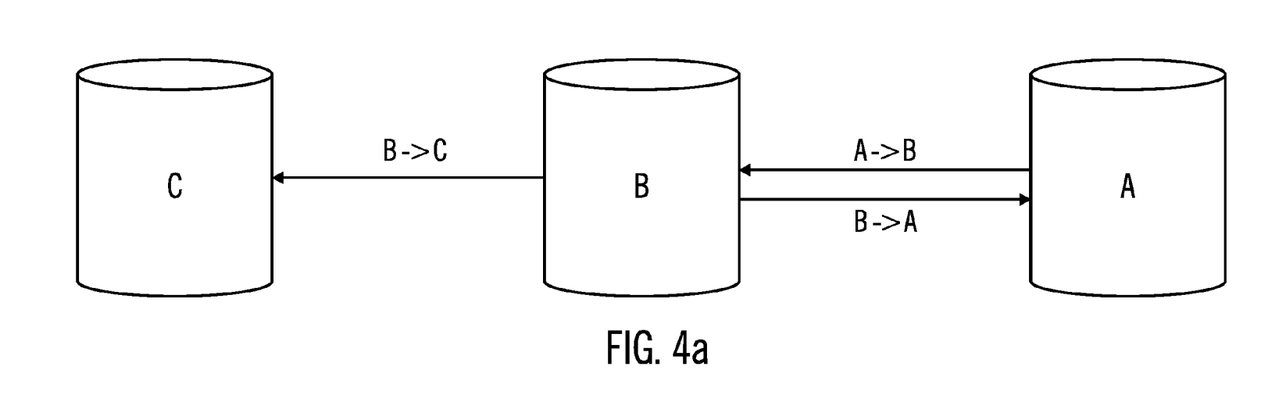
FIGS. 4a, 4b, 5-8 are further schematic diagrams of embodiments of the storage system.
Figure 4B:
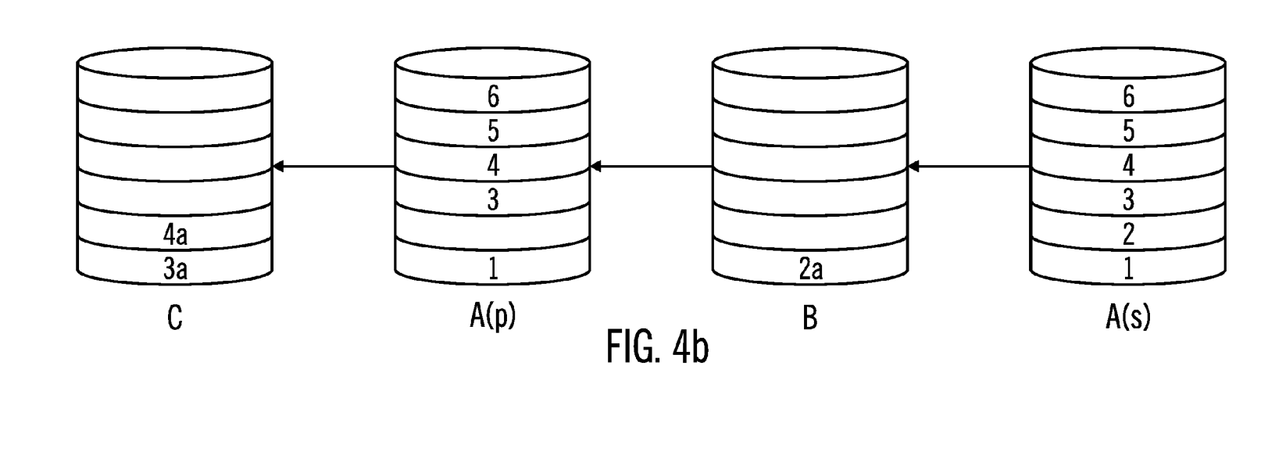

FIG. 4 details a specific implementation of the aging process using a reverse FlashCopy® feature. On other platforms there will be a different detailed sequence of steps that achieve the same goal, or further algorithms that are required, however each implementation would tend to show an accumulation and merging or ageing process as described above. This first implementation creates and deletes maps between storage volumes to achieve the required result. In certain embodiments, there are three vdisks, with the following initial role assignment, A being the "right-most-disk", holding the full copy of data, B being the "middle-disk" holding the previous generation of data and C being the "left-most-disk" and holding the current generation of data and also receiving the host IO. A can be, but is not required to be, a fully allocated vdisk. In certain embodiments, B and C are space efficient vdisks.

At the start of the aging process there are currently two maps defined A→B and B→C that establish the copy-on-write which captures new data onto disk C. This mode might be run for a period of time to accumulate an image on C which approaches the size of that on B. The merge process is then started. Firstly, using the Reverse FlashCopy® feature, a map is created and started B→A, (FIG. 4a showing the topology of the system at this point) and this copy is run to completion, so that the data contents of B that are resident on B (i.e. those portions that have been split from A onto B) have been merged onto A. When the map B→A is 100% complete, (at which point the B→A map is idle/copied) then map A→B is stopped, and then both maps B→A and A→B can be deleted, which removes vdisk B from the cascade, leaving just A→C operating. B is then established as a FlashCopy® of C, map C→B. Map C→B is prepared and started. This has the effect of resetting the contents of B so that it is empty once more. At the same point that the FlashCopy® map is started, IO is first queued, and then dequeued as the map starts and this IO is delivered to vdisk B, in place of C.

The end arrangement is therefore with disk A as the "right-most-disk" as above, holding the full copy of data, disk C now as the "middle-disk" holding the previous generation of data, and disk B now the "left-most-disk", holding the new (initially empty) current generation, now receiving host IO, which therefore allows a period of accumulation of data to be performed at the start of another cycle, though now the roles of B and C are reversed.

FIG. 4b shows how internally the system arranges itself to achieve the reverse at the point shown in FIG. 4a. Disk A is present at two points in the 'cascade'. A(s) (s denotes secondary) is the 'old' image of A at the point that the B→A map was started. It is there in order to maintain the consistency of the image on vdisks downstream of it; in this case that is disk B. A(s) does not support host IO. B does support host IO, though that capability is not used in this implementation. A(p) (p denotes primary) is the new image of A established by the start of the B→A map. At that point it logically contains the same data as B. Since, in this case, B is mostly the same as A(s), A(p) also physically contains the data as B. Therefore the data structures for map B→A record that A(p) already contains data for grains 1,3,4,5,6. Only one grain is marked as being physically resident on B (as 2a). A background process is used to copy this data to make it physically resident on A(p). Once this background copy process completes, A(p) contains the full copy of data, and the maps A→B and B→A can be stopped as described above.

An alternative arrangement is possible using SVC's FlashCopy®. In this arrangement, starting again with the same set of vdisks with disk A holding a full copy of data, disk B holding the previous generation of data and disk C holding the current generation of data and also receiving host IO. In this case though, the maps that have been created are A→B and A→C, along with the reverse maps B→A and C→A. These maps are retained through multiple cycles of the algorithm. At the start of the accumulation phase, to achieve these roles on A, B and C, the following FlashCopy® manipulations were performed in which the host IO is quiesced, the map B→A starts logically copying the previous generation of data onto A, the map A→C is started and the host IO is directed to disk C.

Through the operation of the reverse FlashCopy®, the vdisks and maps are arranged in a cascade as A(s)→B→A(p)→C. While this might appear to mean that during accumulation the vdisk A(p) will begin to serve host IO, defeating the objective, because B→A is started at the same point that A→C was started (and host IO was directed to C), A(p) is in fact empty. Therefore, accumulation IO is still primarily served from B, and in exceptions is served from A(s) instead. To ensure that A(p) does not serve host IO, the background copy rate on the B→A map is set to 0%, which in SVC prevents any background copy.

The merge process is now initiated by simply setting the background copy rate to a predefined number, to cause the contents of B to be emptied onto A(p). The map A→B is also stopped, and when both these processes are complete, the next cycle can be initiated using the steps, host IO is quiesced, the map C→A is started, the map A→B is started and host IO is directed to B, which again inverts the roles of B and C compared to the previous cycle, leaving disk A holding the full copy of data, disk C holding the previous generation of data and disk B holding the new (initially empty) current generation and now receiving host IO.

The above examples illustrate there will be many ways of manipulating a particular FlashCopy® implementation to implement certain embodiments. However, all such schemes would still show the same processes being performed of accumulating the most recent write traffic into a new container, merging a previous generation of write traffic into the full-copy container and repeatedly cycling to perform these steps multiple times. Note also that though the above description showed discrete phases for these two processes, it is possible to overlap them in time to a degree so that some further data can be accumulated while merging is ongoing. Indeed this will be necessary to some degree in all implementations.

The result of the hardware and software implementation described above is that recently written data is retained on the space-efficient FlashCopy® disks 14 and 16, which comprise a small amount of fast storage, while data that has not been recently written (and is therefore by implication infrequently written) is kept on larger amounts of slower, but less expensive storage disks 12. Though those techniques provide an advantage with respect to data that has been recently written, they do not necessarily improve the handling of read IO. If data is frequently read, but infrequently (or almost never) written, then using a copy-on-write scheme such as FlashCopy®, the data will continue to be maintained on the slow storage medium 12, and any read IO to that data will suffer the performance of that slower storage medium 12. Additionally, where data is about to be written for the first time in recent history, and as such must be copied from slow to fast storage, then most often that data will have recently been read. Therefore the data storage system must read the data from the slow storage twice, and suffer the performance impact twice. It is possible to implement read caching in front of the slow storage 12 to address this second concern, but this solution does not help with the first concern. Of course, introducing another read caching layer also increases the cost of the system.

To deal with this problem, the data storage system can be extended, as mentioned above, to include a copy-on-read algorithm, which moves data from the slow storage 12 to faster storage 14 using a process which mimics that of the known copy-on-write technique used in FlashCopy®, but is activated by the receipt of a read IO being serviced at the slow storage medium 12. As a result, where a particular region of storage is subjected to frequent read IO, but little write IO, it will be located on the fast storage 14, and the system will benefit from the faster storage's performance. Similarly, in the read-before-write scenario, the copy-on-read process moves the data from slow storage 12 to fast storage 14, so that the later write IO does not suffer the same penalty as the read IO, when it is performed.

Figure 5:
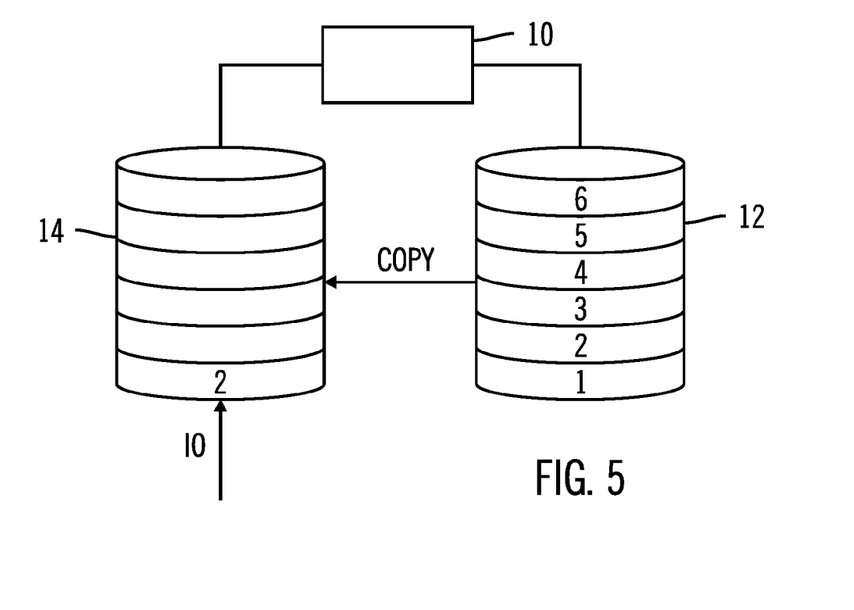

Receipt of a read IO where data has not been copied from slow storage triggers the algorithm. This is shown in FIG. 5. Sector 2 has been read. Data for the IO is read from the slow storage 12, and written to the fast storage 14, and then the metadata structures are updated to indicate that the data is now located on the fast storage 14. The host read IO that triggers the algorithm can be completed in parallel with the updates to the metadata structure. In the case of SVC, the metadata updates required to mark the data as having been copied are bits in a bitmap held in two nodes of the cluster. A read IO which is for less than a grain (where grain is the name given to the unit of management of data placement in SVC's FlashCopy®), is expanded to read a full grain of data. Each bit in SVC's bitmap tracks the location of a grain of data. Any future reads of this data are handled directly by the faster storage medium 14.

As discussed above, periodic aging of the data on the faster storage medium(s) to the slower storage medium 12 is required. The aging/merging process, which operates to migrate data that was updated recently into the slower storage, can itself be improved. This aging process operates, in one embodiment, uses a reverse FlashCopy® technique, and acts in effect to establish an image of data on the slower storage medium 12, which was captured at a point sometime earlier. Under the examples above, the merging process acts to move the image-before-last's data onto the slower storage medium 12.

Though this operation is correct from the FlashCopy® point of view, in that it maintains a well-defined image on the slow storage medium 12, at all times, this operation is not necessary from the point of view of the objectives of the overall storage system method of splitting the data between different levels of storage medium. The system goal is to maintain a single consistent image for the host storage on the most recent FlashCopy® disk and therefore the images of older generations of data to not need to be consistent, they simply need to act to maintain the most recent generation of data needed to satisfy the consistent image the host is accessing on the most recent FlashCopy®. A further weakness of the FlashCopy® algorithms when used for splitting the data storage is that they tend to establish multiple generations of data across the multiple levels of vdisk image, where only the most recent generation of data is actually needed.

It is therefore advantageous if the storage system can act so as to eliminate the merging/migration of data which is not the most recent generation, in order to reduce the amount of data that needs to be merged into the slow storage on each cycle of the algorithm, and as a result further reduce the write traffic that must be satisfied by that storage, and therefore provide further opportunity for reducing the cost of the whole system. Further, if the system can act to eliminate older generations of data from the higher-performance/more expensive tiers of data, then additional cost savings can be achieved. In order to achieve this, the system operates by extending the sequence of updates that are performed when data is migrated between the tiers of faster storage.

Taking the case of three disks, comprising a slow disk 12 (the right-most disk), and two tiers of faster storage 14 and 16 providing a newest generation of data (the left-most disk) and a previous generation of data (the middle disk), where the most up-to-date data is located on the previous generation (middle) disk 14, then the metadata structures will indicate that that data has been copied from the right-most disk 12 to the middle disk 14, but that it has not been copied from the middle to the left-most disk 16. In this system, a write IO will trigger the migration of data from the previous generation to the newest generation of data, which will update the metadata to mark the data as having been copied from one to the other.

It is possible to modify the FlashCopy® algorithms and how they manage the metadata to indicate as if the data had not been copied from the right-most disk to the middle disk. As a result, when the aging/merging process is invoked to move data from the middle disk 14 to the right-most disk 12, only data on the middle disk 14 which has not been further updated and migrated to the left-most disk 16 is migrated to the right-most disk 12. Data which exists on both the middle and left-most disks is ignored by the migration process.

Figure 6:
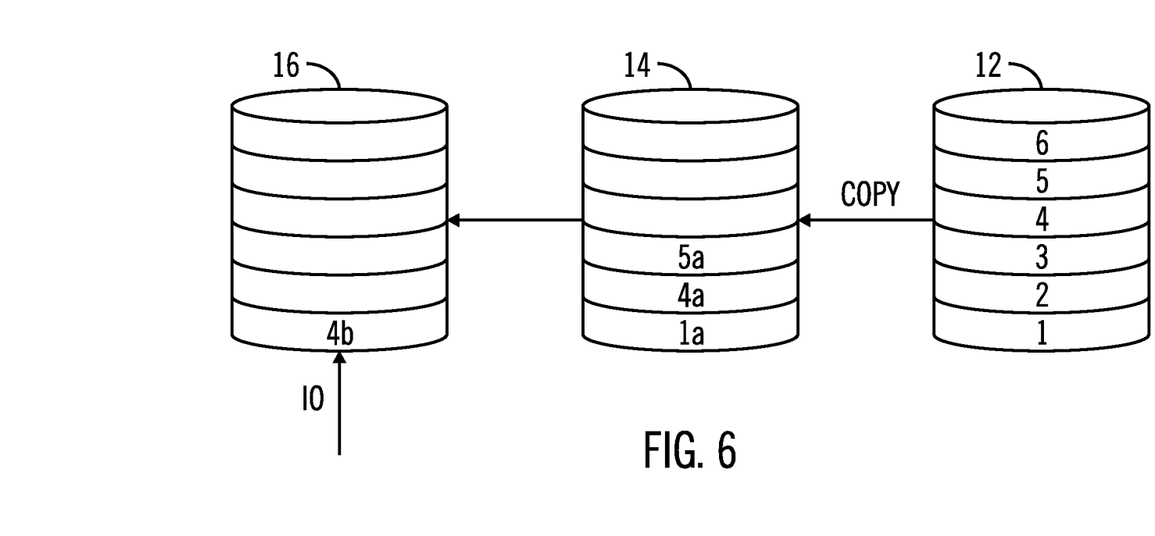

FIG. 6 illustrates this principle. In a first cycle, sectors 1, 4 and 5 have been written to and have therefore been copied to the faster storage medium 14. In a later cycle sector 4 has been written to again is therefore copied to the second faster storage medium. When the merge of the content of the middle disk 14 back to the slow disk 12 takes place, only sectors 1 and 5 are copied back onto the slower storage medium 12, as the sector 4 is also present on the left-most disk 16. A further, optional, step also acts as part of the same scenario to de-allocate the space on the middle disk 14 as soon as the associated data has been migrated to the left-most disk 16. This space reclamation eliminates the redundant historical image of the data, and thus reduces the total amount of storage required at the higher performance tiers. In the example of FIG. 6, the sector 4a would be de-allocated from the middle disk 14.

The clearest implementation makes additional changes to the metadata manipulations so as to cause the merge process to avoid merging data which has been copied to the newest generation. Using SVC's Space-Efficient FlashCopy® implementation as a reference, consider a grain of data held on the middle tier, but not the newest tier in which the left most disk 16 is unallocated, the left-to-middle map indicates data has not been copied, the middle disk 14 is allocated, the middle-to-right map indicates data has been copied and the right disk 12 is allocated. In this case, a write IO triggers the following steps, step 1 read data from middle disk 14, step 2 write data to left most disk 16 (which as a side-effect triggers the allocation of space there), step 3 update left-to-middle map to indicate data has been copied, step 4 update middle-to-right map to indicate data has not been copied and step 5 de-allocate space on middle disk 14. The resultant end-state is now that the left most disk 16 is allocated, the left-to-middle map indicates data has been copied, the middle disk 14 is unallocated, the middle-to-right map indicates data has not been copied and the right disk 12 is allocated.

The merge process then acts conventionally to migrate the data that is marked as copied onto the middle storage 14 back to the right disk 12, and as a consequence of the above algorithm avoids moving data which was subsequently also moved to the left-most storage 16. An obvious extension of these principles can also de-allocate space on the slow storage 12 when its data is migrated to the higher-performing storage. This may or may not be advantageous, depending on the cost of performing the de-allocation, and the value of the storage saving achieved as a result.

An alternative implementation which achieves the same effect would be to adjust the merge process operation, so that where the metadata indicates data has been copied to the newest generation, (i.e. is copied to the left most disk 16) to disregard any indication that the data has been copied to the middle disk 14, as if that metadata had been updated to indicate that as in step 4 above. That is, step 4 could be implicit as a result of step 3 and an adjustment to how the merge process examines the metadata, rather than requiring an explicit update to the metadata.

The operations described above in running the storage system and the optional enhancements optimise the placement of data and eliminate some redundant movement and copying of data. Operations that migrate data between the high-performance tiers however still require copy-on-write (or copy-on-read) algorithms to be employed to allow update of recently accessed data, and to allow data to be retained in the most recent generation to achieve future optimised access. These copy operations are purely for the benefit of the Flash-Copy® algorithms, and are not required to achieve the system objective of retaining the most up-to-date data for future IO access. There is a benefit to be had in eliminating the physical copy operations, if this can be achieved without undermining the correctness of the metadata used by the FlashCopy® algorithms to track the access history for the data.

The multiple generations of data hosted on the high-performance storage can be embodied by a single space-efficient vdisk. In this case, IO access to any of the high-performance generations is forwarded to this single vdisk image. The read/write IO operations involved in copying data between generations, or deallocating storage from a generation, are represented by higher-level primitives which are then implemented in the space-efficient layer in an optimised way. A copy operation is expressed by describing the source and target vdisk addresses, and the block address to be copied. Where the source and target vdisk are hosted on the same space-efficient vdisk, the copy operation is implicitly satisfied and so the copy operation completes successfully without performing IO (if the vdisks do not share storage then the IO operation is performed using read and write IO in a conventional way). A de-allocate operation is expressed by describing a vdisk from which the data is to be eliminated, a vdisk at which the data is to be retained, and the block address to which the operation applies. Where the source and target vdisk are hosted on the same space-efficient vdisk, the de-allocate operation is implicitly satisfied and so completes without performing IO (if the vdisks do not share storage then the de-allocate operation is performed on the required vdisk in a conventional way).

The more conventional sequence of steps for a migration operation of reading data from middle disk 14, write data to left most disk 16 (which as a side-effect triggers the allocation of space there), updating the left-to-middle map to indicate data has been copied, updating the middle-to-right map to indicate data has not been copied, and de-allocating space on the middle disk 14 are re-expressed using the following new primitives. Copy data from middle disk 14 to left-most disk 16, update left-to-middle map to indicate data has been copied, update middle-to-right map to indicate data has not been copied, and de-allocate space on middle disk 14 (but retain on the left-most disk 12). Where the middle and left-most disks are hosted on the same space efficient vdisk, the first and last steps complete immediately without performing any work. This leaves the FlashCopy® metadata updates as the only steps that are required to operate the space management algorithm for this IO scenario.

Note that the new IO primitives rely on properties of the FlashCopy® algorithms in particular as used by the storage system for correct operation. Where a copy operation from vdisk A to vdisk B is requested, then no access to vdisk B will be performed until the FlashCopy® layer has received successful completion to that copy operation. Before a deallocate operation to vdisk A (retaining vdisk B) is requested, the FlashCopy® layer will ensure that there is no access to vdisk A. These rules are inherently observed by the FlashCopy® algorithms, and mean that the above primitives are sufficient to implement certain embodiments, and maintain correct IO operation.

The storage system, in certain embodiments, utilises a method for using FlashCopy® and Space Efficient (thin provisioning) to separate frequently accessed and less frequently accessed data. A typical implementation of this storage system would be to store frequently accessed data on high performance (and hence higher cost) storage while storing less frequently accessed data on lower performance (and hence less expensive) storage. It is also possible to further extend this idea to use multiple tiers of storage, so that the most frequently accessed data is kept on the fastest tier and less frequently accessed data is stored on slower tiers according to access frequency, with the least frequently accessed data being stored on the slowest tier.

The advantage of using more than two tiers of storage is that it allows users to store more of their data on less expensive storage without losing the performance benefits provided by faster tiers of storage. An example where three tiers of storage might be appropriate is where tier 1 storage is implemented using solid state flash storage, tier 2 is implemented using high performance FC or SAS hard discs and tier 3 is implemented using SATA hard discs.

Figure 7:
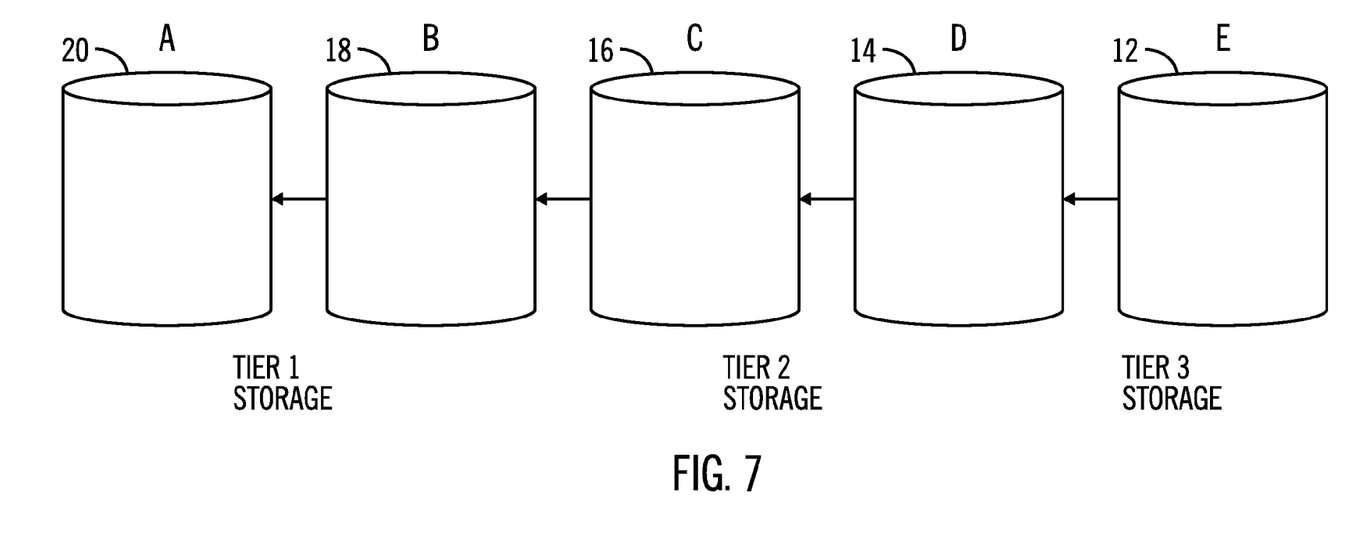

FIG. 7 shows an implementation that distributes data across three different tiers of storage, tier 1 is the fastest storage, tier 2 is intermediate storage and tier 3 is the slowest storage. Initially, all of the data is stored on the slowest (tier-3) storage volume E and there is created a cascade of Flash-Copy® mappings with two space-efficient volumes on tier 2 storage and two space-efficient volumes on tier 1 storage. Host write I/O is initially directed to volume A.

Initially the implementation as described above is applied to volumes A, B and C. As new data is written by the host it is stored on volume A. If partial grains of data are written then the FlashCopy® copy-on-write algorithm will read the old copy of data from the appropriate volume higher up the cascade, merge in the new data and write a whole grain to volume A. After a delay of length X, the FlashCopy® from volume C to B is reversed so that data on B is copied back on to volume C. When the reverse FlashCopy® from B to C has completed volume B is then removed from the cascade. A new volume B is created on tier 1 storage and is added to the left hand end of the cascade, with host I/O is re-directed to this new volume B. As new data is written by the host it is stored on volume B. If partial grains of data are written then the FlashCopy® copy-on-write algorithm will read the old copy of data from the appropriate volume up the cascade, merge in the new data and write a whole grain to volume B. After a delay of length X, the FlashCopy® from volume C to A is reversed so that data on A is copied back on to volume C. When the reverse FlashCopy® from A to C has completed volume A is then removed from the cascade. A new volume A is created on tier 1 storage and is added to the left hand end of the cascade, host I/O is re-directed to this new volume A. The algorithm then repeats.

This algorithm ensures that at any point in time frequently accessed data (data that has been accessed within time X) is kept on tier 1 storage, data that has been accessed within time X to 2X may be kept of tier 1 storage and data that has been accessed less frequently will be kept on volume C (tier 2 storage) or volume E (tier 3) storage.

To ensure the least frequently accessed data is kept on tier 3 the implementation described above is also applied to volumes C, D and E. After a delay of length Y, the FlashCopy® from volume E to D is reversed so that data on D is copied back on to volume E. When the reverse FlashCopy® from D to E has completed volume D is then removed from the cascade. A new volume D is created on tier 2 storage and is inserted in the cascade to the left of volume C. The process copying data from tier 1 to tier 2 storage is adjusted so that instead of using volumes A, B and C it uses volumes A, B and D. After a delay of length Y, the FlashCopy® from volume E to C is reversed so that data on C is copied back on to volume E. When the reverse FlashCopy® from C to E has completed volume C is then removed from the cascade. A new volume C is created on tier 2 storage and is inserted in the cascade to the left of volume D. The process copying data from tier 1 to tier 2 storage is adjusted so that instead of using volumes A, B and D it uses volumes A, B and C. This algorithm then repeats.

By choosing a value for Y that is greater than X this ensures that frequently accessed data (data that has been accessed within time X) is kept on tier 1 storage, data that has been accessed within time X to 2X is stored on either tier 1 or tier 2 storage, data that has been accessed within time 2X to Y is kept on tier 2 storage, data that has been accessed within time Y to 2Y is stored on either tier 2 or tier 3 storage and data that has been accessed less frequently will be stored on tier 3 storage. The values of X and Y can be modified to achieve a desired balance between performance and the amount of storage consumed in each tier.

The implementation described above with reference to FIG. 7 uses two instances of the original implementation of FIG. 2 for example, applied to different volumes in the same FlashCopy® cascade. Applying two instances of the process to the same cascade places additional requirements on the cascade. For example, it is necessary to be able to create new target copies of volumes at any point in the cascade. An implementation of multiple target FlashCopy® is implemented by IBM SAN Volume Controller 4.2.1, for example. It must also be possible to reverse the direction of a Flash-Copy® between any two adjacent volumes in a cascade.

Ideally the two instance of the original implementation of FIG. 2 for example should be able to act independently in creating, deleting and reversing FlashCopies at the desired time intervals. However, because both instances are operating on the same cascade and in particular because both are operating on volume C there may be interactions between the two instances that cannot be handled by the implementation of FlashCopy®. The implementation of FlashCopy® in IBM SAN Volume Controller with the addition of reverse Flash-Copy®, supports these interactions, however an alternative implementation may have to impose some further restrictions between the instances. Firstly, it may be necessary to serialise the invocation of reverse FlashCopy® so that only one reverse copy is active at a time within the cascade and secondly, it may be necessary to delay the deletion and creation of a new volume in the cascade required by one instance, until a reverse FlashCopy® operation initiated by the other instance has completed. If these additional restrictions are required by an implementation then the process is simply modified so that at the end of each step the storage system waits until the cascade is in a viable state before executing the next step.

The storage system can be generalised to deal with further tiers of storage by adding additional pairs of volumes into the cascade and using further instances of the main process with different time periods to control when data is moved back on to slower storage tiers.

Figure 8:
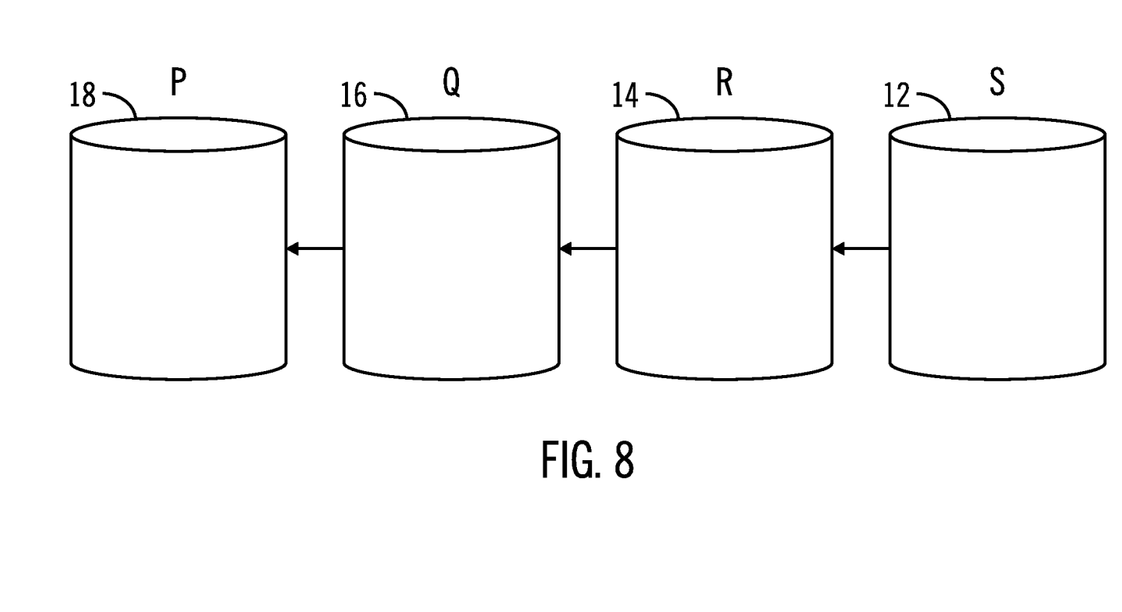

The storage system can be extended to use multiple Flash-Copy® targets. The addition of extra FlashCopy® targets increases the amount of metadata that has to be maintained, but can reduce the amount of higher performance storage that is required to implement a guarantee that data that has been accessed within the last X minutes, is stored on the higher performance storage medium or media. For example, FIG. 8 shows a FlashCopy® cascade that has three targets P, Q and R that are provisioned from high performance storage media 14 to 18 and a source S that is provisioned from low performance storage media 12. Host I/O is initially directed to volume P.

The following phases of operation are then repeatedly executed. Step 1, new data written by the host is accumulated on volume P. Step 2, after time period Y, the FlashCopy® mapping from S→R is reversed, copying data on back on to S. When the reverse completes, volume R is then deleted from the cascade, leaving a FlashCopy® cascade S→Q→P and a new mapping is created from P→R to produce a cascade S→Q→P→R. Host I/O is re-directed to volume R. Step 3, new data written by the host is accumulated on volume R. Step 4, after time period Y, the FlashCopy® mapping from S→Q is reversed copying data on back on to S. When the reverse completes, volume Q is then deleted from the cascade, leaving a FlashCopy® cascade S→P→R, and a new mapping is created from R→Q to produce a cascade S→P→R→Q. Host I/O is re-directed to volume Q. Step 5, new data written by the host is accumulated on volume Q. Step 6, after time period Y, the FlashCopy® mapping from S→P is reversed, copying data on back on to S. When the reverse completes, volume P is then deleted from the cascade, leaving a Flash-Copy® cascade S→R→Q and a new mapping is created from Q→P to produce a cascade S→R→Q→P. Host I/O is re-directed to volume P.

At the start of steps 1, 3 or 5, data that has been accessed within the last 2Y minutes is stored on the high performance storage media 14 to 18 and all other data is stored on low performance storage medium 12. Over the next Y minutes, further data is collected on high performance storage so that by the start of step 2, 4 or 6, data that has been accessed within the last 3Y minutes is stored on the high performance storage media 14 to 18, and all other data is stored on the low performance storage medium 12. When the reverse FlashCopy® is started, data that has not been accessed within the last 2Y minutes is copied back on to the low performance storage medium. Therefore over time, data that has been access within the last 2Y minutes is kept on high performance storage media 14 to 18, data that has not been accessed within the last 3Y minutes is kept on low performance storage medium 12, and data that has only been accessed within the last 2Y to 3Y minutes may be on high or low performance storage, depending on the phase of operation of the algorithm.

If the requirement is to keep data that has been accessed within the last Z minutes on high performance storage media 14 to 18, then using just two targets (A and B, FIG. 2 embodiment) it would be necessary to set X=Z to meet this guarantee, and in the worst case the system would be storing all data that has been accessed within the last 2Z minutes on the high performance storage. With three targets (P, Q and R, FIG. 8 embodiment) it would be necessary to set Y=Z/2 and in the worst case the system would be storing all data that has been accessed within the last 3Z/2 minutes on high performance storage.

Therefore by introducing more targets into the cascade it is possible to implement the same requirement without having to store as much data on high performance storage. By further increasing the number of targets in the cascade it is possible to further reduce the amount of data that is kept on high performance storage. A generalized implementation has a source volume S that is provisioned from one tier of storage and N target volumes (T1, T2, ... TN) that are provisioned from a second tier of storage. A set of FlashCopy® mappings are created to form a FlashCopy® cascade with the source volume at the head of the cascade and each target volume cascaded from the previous target volume. The following steps are repeated. Step 1, host I/O is directed to the target volume at the end of the cascade (furthest away from the source), step 2, periodically the FlashCopy® mapping at the head of the cascade is reversed to copy data from the target adjacent to the source in the cascade back on to the source and step 3 when this reverse copy completes the FlashCopy® mapping for the target is deleted, the contents of the target volume are discarded and a new FlashCopy® mapping is created to add the target volume at the end of the cascade (furthest away from the source).

The invention claimed is:

1. A controller coupled to a first storage medium, a second storage medium, and a third storage medium, wherein the first storage medium, the second storage medium, and the third storage medium are connected to directly perform one or more copy functions, wherein the first storage medium is of a lower performance type, and the second storage medium and the third storage medium are of a higher performance type, and wherein the controller is configured to:
   store an image comprising a plurality of regions of data on the first storage medium;
   initiate a copy function to copy one or more regions of the plurality of regions of data stored in the image on the first storage medium, from the first storage medium to the second storage medium, in response to an Input/Output (IO) access to the one or more regions of the plurality of regions of data stored in the image on the first storage medium and direct all JO access for the image to the second storage medium, in response to completion of the initiated copy function; and
   moving a first region of IO accessed data stored in the second storage medium from the second storage medium to the first storage medium, wherein:
   in response to the data stored in the second storage medium reaching a predetermined size directing IO access to the third storage medium, and subsequent to directing IO access to the third storage medium and subsequent to a set of I/O accesses to the third storage medium to build up a new generation of data in the third storage medium, moving a second region of IO accessed data stored in the third storage medium from the third storage medium which is of the higher performance type to the first storage medium which is of the lower performance type; and
   in response to the data stored in the third storage medium reaching another predetermined size directing IO access to the second storage medium, and subsequent to directing IO access to the second storage medium and subsequent to another set of I/O accesses to the second storage medium to build up another new generation of data in the second storage medium, moving a third region of IO accessed data stored in the second storage medium from the second storage medium which is of the higher performance type to the first storage medium which is of the lower performance type, wherein the image comprises a vdisk, wherein the second storage medium and the third storage medium comprise a single disk, and wherein the controller is configured to maintain address metadata for data stored by the single disk and to adjust the address metadata in response to IO that would otherwise copy data between the second storage medium and the third storage medium.

2. The controller of claim 1, wherein the controller is coupled to a highest performance tier of storage medium, wherein the second and third storage media comprise an intermediate tier between the highest performance tier and the first storage medium and wherein the controller is further configured to initiate a copy function from the intermediate tier to the highest performance tier, direct all IO access for the image to the highest performance tier and to move a fourth region of relatively infrequently accessed data stored in the highest performance tier from the highest performance tier to the first storage medium.

3. The controller of claim 1, wherein the copy function from the first storage medium to a different storage medium comprises both a copy-on-write function and a copy-on-read function.

4. The controller of claim 1, wherein the first storage medium is a hard disk, and the second storage medium is a solid state memory device, and the hard disk and the solid state memory device are external to the controller.

5. The controller of claim 4, wherein the plurality of regions of data have different requirements for performance, and wherein in response to completion of the initiated copy function the one or more regions are deleted from the image stored on the first storage medium.

6. A computer program product on a non-transitory computer readable medium for operating a data storage system, wherein the data storage system comprises, a controller, a first storage medium, a second storage medium, and a third storage medium, wherein the first storage medium, the second storage medium, and the third storage medium are connected to directly perform one or more copy functions, wherein the controller is coupled to the first storage medium, the second storage medium and the third storage medium, wherein the first storage medium is of a lower performance type, and the second storage medium and the third storage medium are of a higher performance type, and wherein instructions stored on the non-transitory computer readable medium are configured to have operations performed, the operations comprising:
   storing an image comprising a plurality of regions of data on the first storage medium;
   initiating a copy function to copy one or more regions of the plurality of regions of data stored in the image on the first storage medium, from the first storage medium to the second storage medium, in response to an Input/Output (JO) access to the one or more regions of the plurality of regions of data stored in the image on the first storage medium and directing all JO access for the image to the second storage medium, in response to completion of the initiated copy function; and
   moving a first region of IO accessed data stored in the second storage medium from the second storage medium to the first storage medium, wherein:
   in response to the data stored in the second storage medium reaching a predetermined size directing IO access to the third storage medium, and subsequent to directing IO access to the third storage medium and subsequent to a set of I/O accesses to the third storage medium to build up a new generation of data in the third storage medium, moving a second region of IO accessed data stored in the third storage medium from the third storage medium which is of the higher performance type to the first storage medium which is of the lower performance type; and in response to the data stored in the third storage medium reaching another predetermined size directing IO access to the second storage medium, and subsequent to directing IO access to the second storage medium and subsequent to another set of I/O accesses to the second storage medium to build up another new generation of data in the second storage medium, moving a third region of IO accessed data stored in the second storage medium from the second storage medium which is of the higher performance type to the first storage medium which is of the lower performance type, wherein the image comprises a vdisk, wherein the second storage medium and the third storage medium comprise a single disk, and wherein the controller is configured to maintain address metadata for data stored by the single disk and to adjust the address metadata in response to IO that would otherwise copy data between the second storage medium and the third storage medium.

7. The computer program product of claim 6, the operations further comprising:

maintaining a highest performance tier of storage medium, wherein the second and third storage media comprise an intermediate tier between the highest performance tier and the first storage medium and wherein the controller is further configured to initiate a copy function from the intermediate tier to the highest performance tier, direct all IO access for the image to the highest performance tier and to move a fourth region of relatively infrequently accessed data stored in the highest performance tier from the highest performance tier to the first storage medium.

8. The computer program product of claim 6, wherein the copy function from the first storage medium to a different storage medium comprises both a copy-on-write function and a copy-on-read function.

9. The computer program product of claim 6, wherein the first storage medium is a hard disk, and the second storage medium is a solid state memory device, and the hard disk and the solid state memory device are external to the controller.

10. The computer program product of claim 9, wherein the plurality of regions of data have different requirements for performance, and wherein in response to completion of the initiated copy function the one or more regions are deleted from the image stored on the first storage medium.

* * * * *